United States Patent
Chen et al.

(10) Patent No.: US 10,949,698 B2
(45) Date of Patent: Mar. 16, 2021

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Bin Chen, Tokyo (JP); Daisuke Furukawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/649,720

(22) Filed: Jul. 14, 2017

(65) Prior Publication Data

US 2018/0025250 A1    Jan. 25, 2018

(30) Foreign Application Priority Data

Jul. 22, 2016    (JP) .............................. JP2016-144750

(51) Int. Cl.
| | | |
|---|---|---|
| *G06K 9/46* | (2006.01) | |
| *G06F 16/583* | (2019.01) | |
| *G06K 9/62* | (2006.01) | |
| *G06K 9/34* | (2006.01) | |

(Continued)

(52) U.S. Cl.
CPC .............. *G06K 9/46* (2013.01); *G06F 16/583* (2019.01); *G06K 9/342* (2013.01); *G06K 9/6206* (2013.01); *G06T 7/12* (2017.01); *G06K 2209/053* (2013.01); *G06T 7/149* (2017.01);

(Continued)

(58) Field of Classification Search
CPC ...... G06K 9/46; G06T 7/149; G06F 17/30247
See application file for complete search history.

(56) References Cited

U.S. PATENT DOCUMENTS

| | | | |
|---|---|---|---|
| 7,907,768 B2 * | 3/2011 | Russakoff | G06T 7/344 382/132 |
| 2002/0102023 A1 * | 8/2002 | Yamauchi | G06F 19/00 382/199 |

(Continued)

FOREIGN PATENT DOCUMENTS

JP    2016022143 A    2/2016

OTHER PUBLICATIONS

J. Dehmeshki et al. "Segmentation of Pulmonary Nodules in Thoracic CT Scans: A Region Growing Approach." IEEE Transactions on Medical Imaging. 2008:467-480. vol. 27(4). Cited in Specification.

(Continued)

*Primary Examiner* — John W Lee
(74) *Attorney, Agent, or Firm* — Rossi, Kimms & McDowell LLP

(57) ABSTRACT

An image processing apparatus is configured to extract an object region from an image. The image processing apparatus includes: a setting unit configured to set a plurality of reference points in the image; an obtaining unit configured to obtain a contour of the object region corresponding to each of the plurality of reference points as an initial extraction result based on a characteristic of the object region; and an extraction unit configured to extract the object region from the image based on an integration result obtained by integrating values of pixels in a plurality of initial extraction results.

20 Claims, 9 Drawing Sheets

(51) Int. Cl.
*G06T 7/12* (2017.01)
*G06T 7/149* (2017.01)

(52) U.S. Cl.
CPC .............. *G06T 2207/20076* (2013.01); *G06T 2207/20101* (2013.01); *G06T 2207/30064* (2013.01)

(56) References Cited

U.S. PATENT DOCUMENTS

| | | | | |
|---|---|---|---|---|
| 2003/0194119 | A1* | 10/2003 | Manjeshwar | G06T 7/187 382/131 |
| 2003/0198372 | A1* | 10/2003 | Touzawa | G01S 7/539 382/128 |
| 2004/0037460 | A1* | 2/2004 | Luo | G06T 7/11 382/165 |
| 2005/0225648 | A1* | 10/2005 | Lin | G06T 7/12 348/222.1 |
| 2006/0291702 | A1* | 12/2006 | Miessbacher | G06K 9/00604 382/117 |
| 2008/0226145 | A1* | 9/2008 | Moriya | G06T 7/33 382/128 |
| 2012/0281895 | A1* | 11/2012 | Chono | A61B 8/5215 382/128 |

OTHER PUBLICATIONS

G. Litjens et al. "Evaluation of prostate segmentation algorithms for MRI: The PROMISE12 challenge." Medical Image Analysis. 2014:359-373. vol. 18(2). Cited in Specification.

Office action issued in Japanese Application No. 2016-144750 dated Jun. 1, 2020.

* cited by examiner

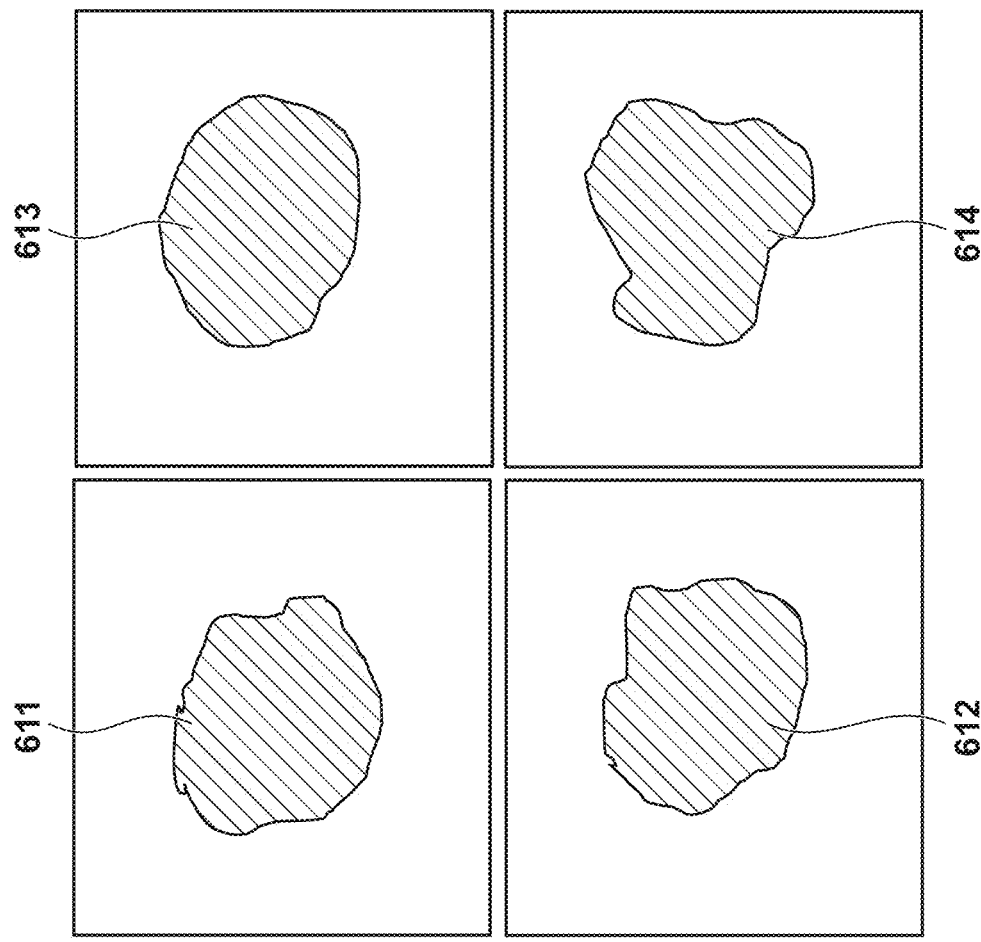
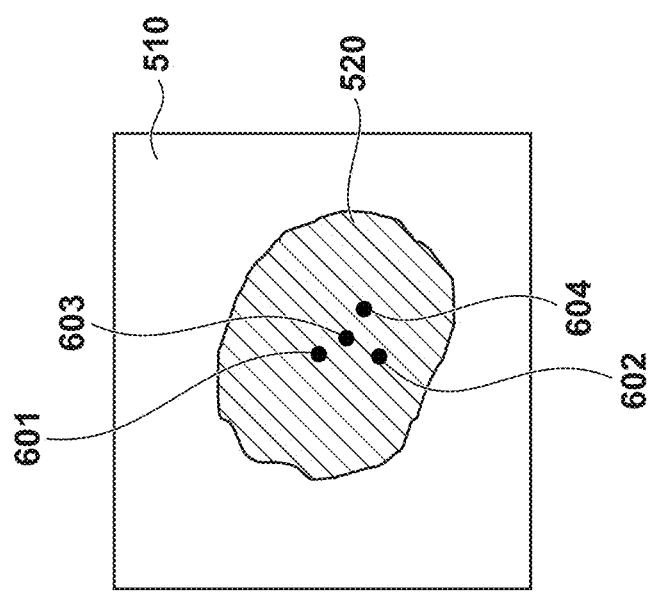

700

| 0 | 0 | 0 | 0 | 0 | 0 | 0 | 0 | 0 | 0 | 1 | 0 | 0 | 0 | 0 |
|---|---|---|---|---|---|---|---|---|---|---|---|---|---|---|
| 0 | 0 | 0 | 0 | 0 | 1 | 1 | 1 | 1 | 2 | 2 | 1 | 0 | 0 | 0 |
| 0 | 0 | 0 | 1 | 3 | 3 | 3 | 3 | 4 | 3 | 3 | 2 | 1 | 0 | 0 |
| 0 | 0 | 1 | 2 | 3 | 4 | 4 | 4 | 4 | 4 | 4 | 3 | 1 | 1 | 0 |
| 0 | 0 | 1 | 1 | 3 | 3 | 4 | 4 | 4 | 4 | 4 | 3 | 2 | 1 | 1 |
| 0 | 0 | 1 | 2 | 2 | 3 | 4 | 4 | 4 | 4 | 4 | 3 | 2 | 1 | 1 |
| 0 | 0 | 0 | 1 | 2 | 2 | 3 | 3 | 3 | 4 | 3 | 3 | 2 | 1 | 0 |
| 0 | 0 | 0 | 0 | 0 | 1 | 1 | 2 | 2 | 3 | 2 | 2 | 2 | 1 | 0 |
| 0 | 0 | 0 | 0 | 0 | 0 | 1 | 1 | 1 | 1 | 2 | 1 | 1 | 0 | 0 |
| 0 | 0 | 0 | 0 | 0 | 0 | 0 | 0 | 1 | 1 | 1 | 0 | 0 | 0 | 0 |
| 0 | 0 | 0 | 0 | 0 | 0 | 0 | 0 | 0 | 0 | 0 | 0 | 0 | 0 | 0 |

IMAGE PROCESSING APPARATUS, IMAGE PROCESSING SYSTEM, IMAGE PROCESSING METHOD, AND STORAGE MEDIUM

BACKGROUND OF THE INVENTION

Field of the Invention

The present invention relates to an image processing apparatus, an image processing system, an image processing method, and a storage medium.

Description of the Related Art

In recent years, many medical images such as a CT (Computed Tomography) image and an MR (nuclear Magnetic Resonance) image are used in the medical field. Accordingly, a load on a doctor in work called diagnostic interpretation in which the doctor makes a diagnosis or examines a treatment policy based on several hundred medical images increases. This raises expectations regarding a technique concerning CAD (Computer Aided Diagnosis) that provides information obtained by analyzing medical images by a computer as an aid for a diagnosis. There is demand to be able to accurately extract a region (an organ or a morbid portion) of interest to a doctor by this technique.

Non-patent literature 1 discloses a technique of searching an image input for a reference point included in a region of interest and performing region extension processing from the reference point, thereby performing region extraction of high reproducibility. Non-patent literature 2 discloses a technique of integrating extraction results of a region of interest obtained by a plurality of algorithms, thereby extracting a region.

[Non-Patent Literature 1] J. Dehmeshki, H. Amin, M. Valdivieso, X. Ye, "Segmentation of Pulmonary Nodules in Thoracic CT scans: A Region Growing Approach", IEEE Med. Imag., Vol. 27(4), pp. 467-480, 2008.

[Non-Patent Literature 2] G. Litjens, W. Ven. Van de, et al., "Evaluation of prostate segmentation algorithmes for MRI: the PROMISE12 challenge", Med. Image. Anal., Vol. 18(2), pp. 359-373, 2014.

In non-patent literature 1, the reproducibility of region extraction can be raised by searching for a reference point using an extraction algorism. However, a satisfactory region extraction result is not necessarily obtained only by using one reference point found, and the region extraction accuracy can vary. In non-patent literature 2, the plurality of algorithms do not have a consistent design policy, and some algorithms do not consider the reproducibility of region extraction. For this reason, if the extraction results of a region of interest obtained by the algorithms are integrated, the reproducibility of region extraction can be low.

The present invention has been made in consideration of the above-described problems, and provides an image processing technique capable of extracting the region of an object from an image at high reproducibility and high accuracy.

SUMMARY OF THE INVENTION

According to one aspect of the present invention, there is provided an image processing apparatus configured to extract an object region from an image, comprising: a setting unit configured to set a plurality of reference points in the image; an obtaining unit configured to obtain a contour of the object region corresponding to each of the plurality of reference points as an initial extraction result based on a characteristic of the object region; and an extraction unit configured to extract the object region from the image based on an integration result obtained by integrating values of pixels in a plurality of initial extraction results.

According to the present invention, it is possible to extract the region of an object from an image at high reproducibility and high accuracy.

Further features of the present invention will become apparent from the following description of exemplary embodiments (with reference to the attached drawings).

BRIEF DESCRIPTION OF THE DRAWINGS

FIGS. 5A and 5B are views for explaining obtaining of an initial extraction result according to the first embodiment;

DESCRIPTION OF THE EMBODIMENTS

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

First Embodiment

An image processing apparatus (system) according to this embodiment extracts the region (contour) of a pulmonary nodule that is an object from a chest CT image (processing target image) of a processing target case. The image processing apparatus integrates a plurality of initial extraction results of the pulmonary nodule obtained based on a plurality of reference points that are included in the object region (pulmonary nodule region) at a high probability. Then, the region (contour) of the object is extracted by a calculation method according to the integration result. A case in which a pulmonary nodule on a chest CT image is set as a processing target image (image) will be described below. However, the application range of the present invention is not limited by the target region of a subject or the type of tumor or modality. A detailed apparatus (system) arrangement, functional arrangement, and processing procedure will be described below.

(Apparatus and System Arrangement)

Figure 1:
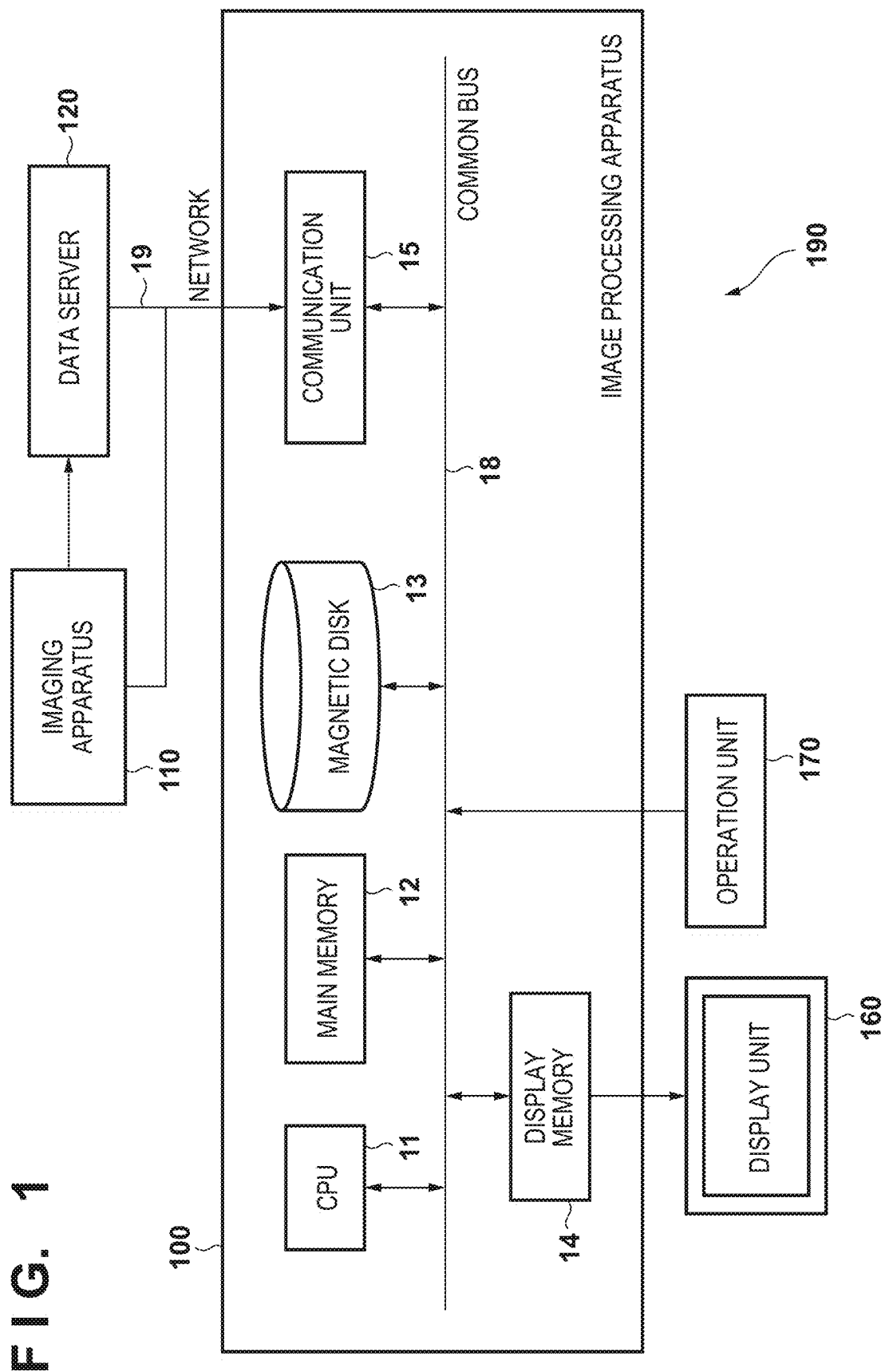
FIG. 1 is a block diagram showing the apparatus arrangement of an image processing system according to the first embodiment.

An image processing apparatus 100 according to the first embodiment of the present invention and an image processing system 190 formed by devices connected to the image processing apparatus 100 will be described in detail with reference to FIG. 1. The image processing system 190 obtains a medical image and extracts the region of an object included in the medical image by image processing. The image processing system 190 includes an imaging apparatus 110 that captures an image, a data server 120 that stores the captured image, the image processing apparatus 100 that performs image processing, a display unit 160 that displays the obtained image and the result of image processing, and an operation unit 170 used for operation input. The medical image is an image obtained by performing, for image data obtained by the imaging apparatus 110, image processing or the like to obtain an image suitable for a diagnosis. The units of the image processing system 190 will be described below.

(Arrangement of Image Processing Apparatus 100)

The image processing apparatus 100 is, for example, a computer, and performs image processing according to this embodiment. The image processing apparatus 100 extracts an object region from a processing target image by executing image processing. The image processing apparatus 100 includes a CPU (Central Processing Unit) 11, a main memory 12, a magnetic disk 13, a display memory 14, and a communication unit 15. The CPU 11 functions as a control unit that generally controls the operations of the constituent elements of the image processing apparatus 100. The image processing apparatus 100 may control the operations of the imaging apparatus 110 and the display unit 160 (display device) together by the processing of the CPU 11 (control unit). The main memory 12 stores a program to be executed by the CPU 11 and provides a work area upon execution of the program by the CPU 11. The magnetic disk 13 stores various kinds of application programs including an OS (Operating System), device drivers of peripheral devices, and a program configured to perform image processing according to this embodiment (to be described later). The display memory 14 temporarily stores data to be displayed on the display unit 160. The communication unit 15 is formed by, for example, a LAN card or the like, and implements communication between the image processing apparatus 100 and an external device (for example, the imaging apparatus 110 or the data server 120) via a network 19. The network 19 includes, for example, Ethernet®, LAN (Local Area Network), and WAN (Wide Area Network). In addition, the communication unit 15 can communicate with HIS (Hospital Information Systems) or RIS (Radiology Information Systems) via the network 19 and obtain the information of a subject and various kinds of test information.

The display unit 160 is, for example, a liquid crystal monitor, and displays an image based on the output from the display memory 14 under the display control of the CPU 11 (control unit). The operation unit 170 is, for example, a mouse or a keyboard, and causes an operator (for example, a doctor) to do pointing input or input a character and the like. The display unit 160 may be a touch panel monitor that receives an operation input. The operation unit 170 may be a stylus pen. The above-described constituent elements are connected to be communicable with each other via a common bus 18.

(Arrangement of Imaging Apparatus 110)

The imaging apparatus 110 is, for example, a CT (Computed Tomography) apparatus, an MRI (Magnetic Resonance Imaging) apparatus, a DR (Digital Radiography) apparatus that captures a two-dimensional radiation image, or a PAT (Photoacoustic Tomography) apparatus. The imaging apparatus 110 transmits an obtained image to the data server 120. An imaging control unit (not shown) that controls the imaging apparatus 110 may be included in the image processing apparatus 100. The CPU 11 (control unit) of the image processing apparatus 100 may function as the imaging control unit and control the imaging apparatus 110 by the processing of the CPU 11 (control unit).

(Arrangement of Data Server 120)

The data server 120 holds an image captured by the imaging apparatus 110. The data server 120 is, for example, a server of a PACS (Picture Archiving and Communication System). The image processing apparatus 100 loads data necessary to execute image processing from the data server 120 via the communication unit 15 and the network 19 and obtains an image held by the data server 120.

(Functional Arrangement)

Figure 2:
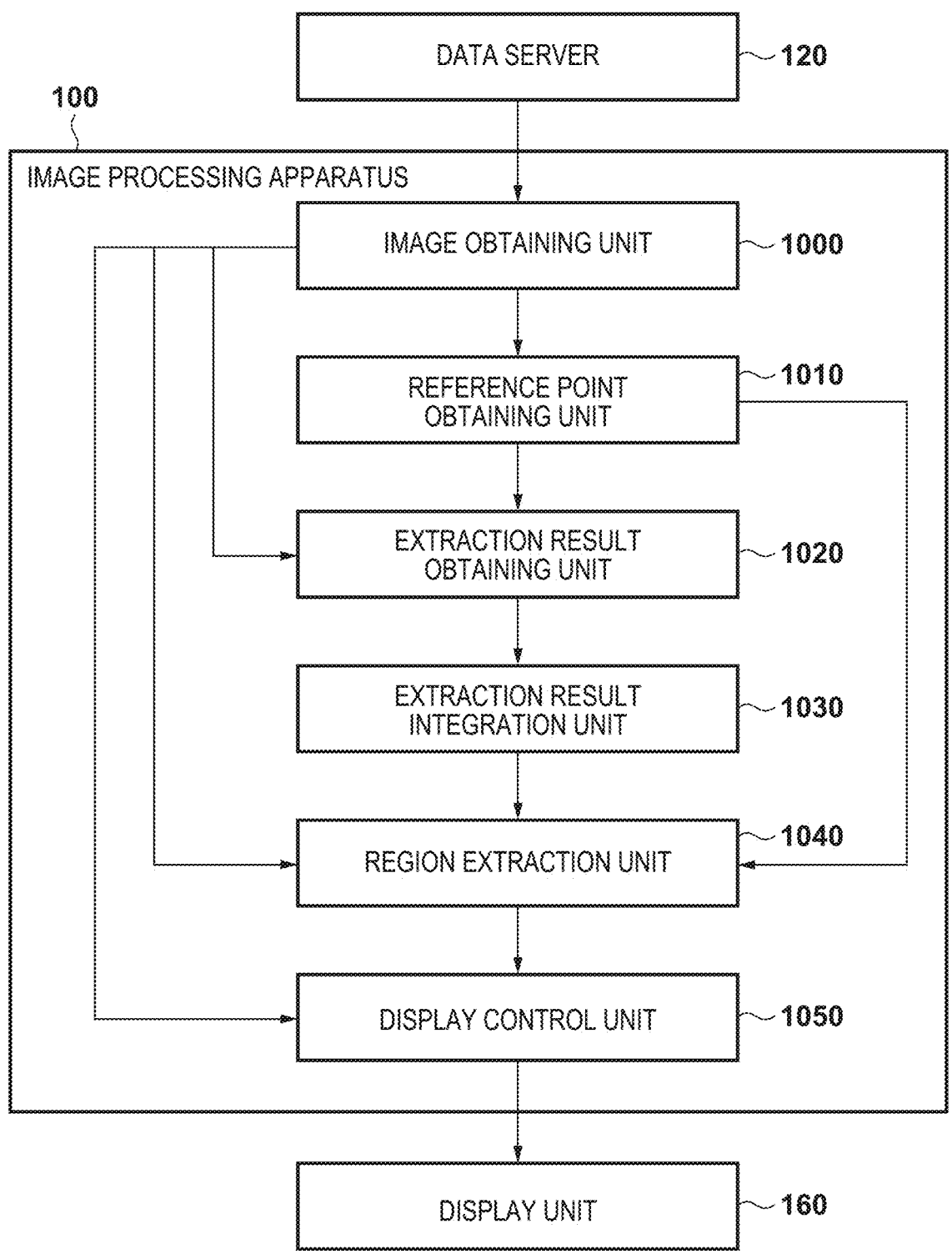
FIG. 2 is a block diagram showing the functional arrangement of the image processing system according to the first embodiment.

Each functional arrangement of the image processing apparatus 100 will be described next with reference to FIG. 2. The functional arrangements are implemented by executing the program stored in the main memory 12 by the CPU 11. The image processing apparatus 100 includes, as the functional arrangements, an image obtaining unit 1000, a reference point obtaining unit 1010, an extraction result obtaining unit 1020, an extraction result integration unit 1030, a region extraction unit 1040, and a display control unit 1050.

The image obtaining unit 1000 controls the communication unit 15 and obtains an image as a target of image processing according to this embodiment as a processing target image from the data server 120. The reference point obtaining unit 1010 obtains information (to be referred to as reference point information hereinafter) concerning a plurality of points (to be referred to as reference points hereinafter) that are included at a high probability in the object region included in the processing target image obtained by the image obtaining unit 1000. The reference point obtaining unit 1010 (setting unit) sets a plurality of reference points in the processing target image. The extraction result obtaining unit 1020 obtains a plurality of initial extraction results representing the object region based on the reference point information obtained by the reference point obtaining unit 1010 and the information of peripheral pixels of each reference point. Based on the characteristic of the object region, the extraction result obtaining unit 1020 (obtaining unit) obtains a contour of the object region corresponding to each of the plurality of reference points as an initial extraction result. The characteristic of the object region includes the characteristic of an intensity value change representing that an intensity value changes between the inside and the outside of the object region, and the characteristic of the contour shape of the object region.

The extraction result integration unit 1030 integrates the plurality of initial extraction results obtained by the extraction result obtaining unit 1020. That is, the extraction result integration unit 1030 generates an initial extraction result (integration result) by integrating the plurality of initial extraction results. The extraction result integration unit 1030 generates an integrated extraction result by integrating (adding) the values of pixels in the plurality of initial extraction results and adding the values of the pixels in the initial extraction results as the pixel values at the same pixel position in the integration result, thereby integrating the plurality of initial extraction results.

The region extraction unit 1040 (extraction unit) extracts the object region from the processing target image based on the integration result obtained by integrating (adding) the values of the pixels in the plurality of initial extraction results. The region extraction unit 1040 extracts the object region from the processing target image based on a result obtained by adding the values of the pixels in the plurality of initial extraction results at the same pixel position. The region extraction unit 1040 generates a likelihood map representing the distribution of likelihoods that the pixels in the integration result are included in the object region, and extracts the object region from the processing target image based on the likelihood map. The region extraction unit 1040 can extract the object region from the processing target image based on the likelihood of each pixel in the likelihood map and the characteristic of the object region. The display control unit 1050 outputs the information of the object region extracted by the region extraction unit 1040 to the display unit 160, and causes the display unit 160 to display the extraction result of the object region.

Note that at least some of the functional arrangements included in the image processing apparatus 100 may be implemented as independent devices. The image processing apparatus 100 may be a workstation. Software configured to implement each functional arrangement may operate on a server via a network including a cloud network. In the embodiment to be described below, each unit is assumed to be implemented by software in a local environment.

(Processing Procedure)

Figure 3:
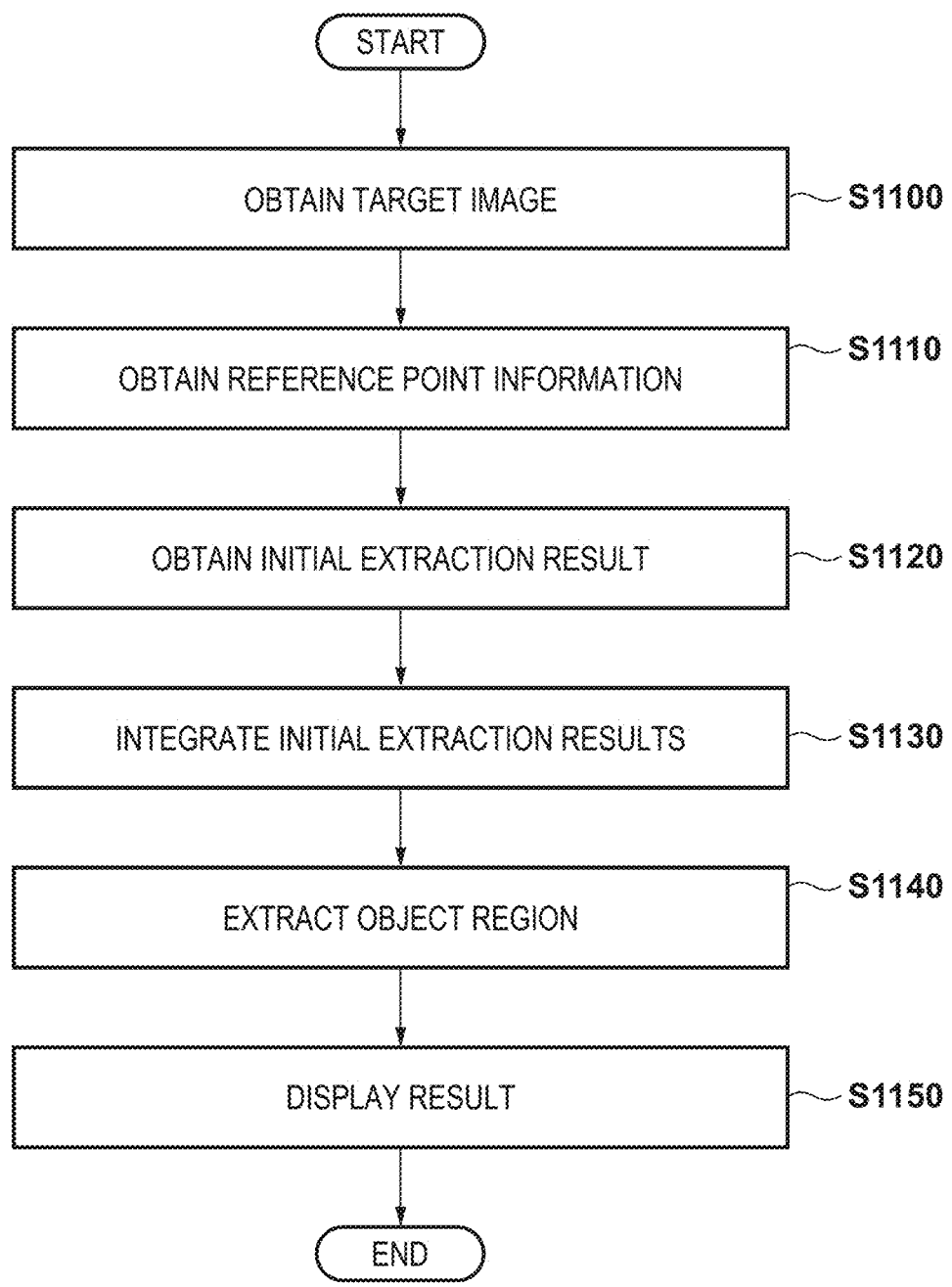
FIG. 3 is a flowchart showing the processing procedure of an image processing apparatus according to the first embodiment.

Image processing according to the first embodiment of the present invention will be described next. FIG. 3 is a flowchart showing a processing procedure to be executed by the image processing apparatus 100 according to this embodiment. This embodiment is implemented by executing, by the CPU 11, a program configured to implement the function of each unit and stored in the main memory 12. In this embodiment, a description will be made assuming that the processing target image is a CT image. The CT image is obtained as a three-dimensional grayscale image. Additionally, in this embodiment, a description will be made assuming that the object included in the processing target image is a pulmonary nodule.

(S1100)

In step S1100, the image obtaining unit 1000 obtains an image (processing target image) as a target of image processing. That is, the image obtaining unit 1000 obtains a CT image as a processing target image from the data server 120, and stores it in the main memory 12 of the image processing apparatus 100. Note that the obtaining of the processing target image is not limited to this example. For example, the image obtaining unit 1000 can obtain the processing target image to which image processing according to this embodiment is to be performed by obtaining, via the communication unit 15, image data captured by the imaging apparatus 110 and performing simple image processing such as density conversion processing to obtain an image suitable for a diagnosis. For example, if the imaging apparatus 110 is a CT apparatus, the image obtaining unit 1000 obtains a one-dimensional distribution of relative X-ray absorption coefficient values called CT values as image data from the imaging apparatus 110. After that, the image obtaining unit 1000 performs processing called image reconstruction, thereby obtaining a processing target image represented by a three-dimensional grayscale image. The image obtaining unit 1000 may obtain the three-dimensional grayscale image obtained by performing image reconstruction as the processing target image.

The processing target image in this embodiment is formed by a plurality of pixels which can be identified by components of three orthogonal axes (x, y, z). A pixel size obtained as additional information when obtaining the processing target image is defined for each of the directions of the three axes. In this embodiment, an example in which the pixel sizes in the directions of the three axes are r_size_x=1.0 mm, r_size_y=1.0 mm, and r_size_z=1.0 mm will be described. The intensity value of the processing target image can be regarded as a function derived by referring to pixel positions in a three-dimensional array of pixels. In this embodiment, the processing target image is expressed as a function $I(x,y,z)$. The function $I(x,y,z)$ is a function that uses three-dimensional real space coordinates $(x,y,z)$ of the imaging region of the processing target image as arguments and outputs the pixel value at the coordinates.

(S1110)

In step S1110, the reference point obtaining unit 1010 obtains information (reference point information) concerning a plurality of points (reference points) that are included at a high probability in the object region included in the processing target image. The reference point obtaining unit 1010 sets n points $p_{seed\_i}$ $(x_{seed\_i}, y_{seed\_i}, z_{seed\_i})$ (i=1, 2, ..., n) that are included in the object region, for example, a pulmonary nodule region at a high probability to reference points. When the n points (reference points) are set, a set (reference point set) $P=\{p_{seed\_i} | 1, 2, \ldots, n\}$ including the reference points $p_{seed\_i}$ (i=1, 2, ..., n) as elements is generated. Obtaining of the reference points by the reference point obtaining unit 1010 will be described below in detail.

First, the operator obtains, via the operation unit 170, m pixels included in the object region (for example, a pulmonary nodule region) drawn in the processing target image $I(x,y,z)$ while referring to, for example, tomographic images on an Axial section, a Sagittal section, and a Coronal section of the processing target image $I(x,y,z)$ displayed on the display unit 160. The reference point obtaining unit 1010 then obtains, as initial reference points $p_{seed\_j}$ (j=1, 2 ..., m), the m pixels included in the pulmonary nodule region obtained by operation input.

Next, the reference point obtaining unit 1010 obtains a local image region $V(x,y,z)$ including the initial reference points. The reference point obtaining unit 1010 can set the position of the local image region $V(x,y,z)$ by obtaining the centroid of the initial reference points $p_{seed\_j}$ and can set the size (image size) of the local image region $V(x,y,z)$ based on the output value of a LoG kernel to be described later. The reference point obtaining unit 1010 sets the centroid of the initial reference points $p_{seed\_j}$ to $p_{seed\_0}$, and obtains the reference point set P in a local image region $V(x,y,z)$ 510 (a pulmonary nodule region 520 in the local image region V 510) having a centroid (a centroid 600 of the initial reference points) at the coordinates of $p_{seed\_0}$, as shown in FIG. 4A. In FIG. 4A, the object region in the local image region $V(x,y,z)$ 510 is shown as the pulmonary nodule region 520.

Figure 4B:
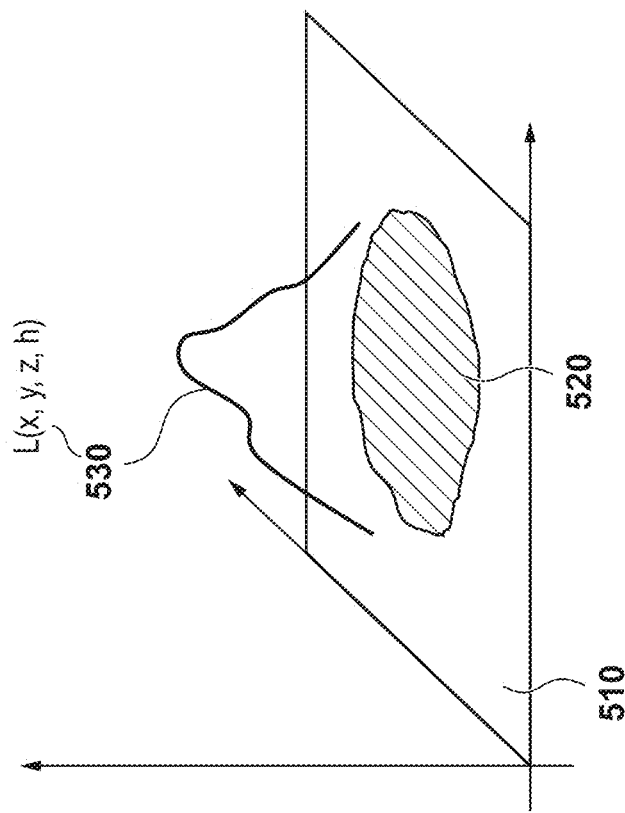
FIGS. 4A and 4B are views for explaining obtaining of a reference point according to the first embodiment.
Figure 4A:
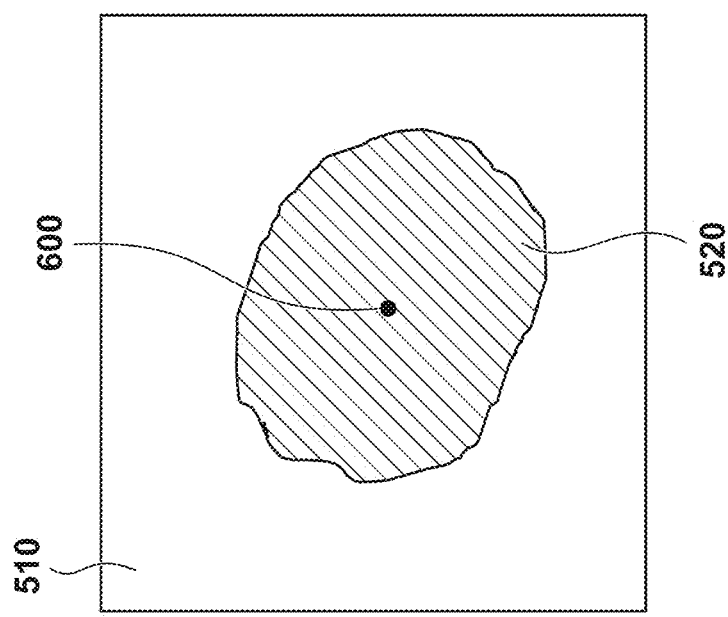

In this processing, the reference point obtaining unit 1010 estimates the size of the object region by a technique based on a scale space, and sets the size (image size) of the local image region $V(x,y,z)$ based on the estimated size of the object region. In this embodiment, a LoG (Laplacian of Gaussian) kernel is used. As shown by the following equations, the reference point obtaining unit 1010 applies a multi-scale LoG kernel given by equations (1) and (2) to a peripheral region $I'(x,y,z)$ of $p_{seed\_0}$ and calculates an output value L(x,y,z,h). The peripheral region is a region including the initial reference points and pixels (points) adjacent to the initial reference points.

$$L(x,y,z,h) = I'(x,y,z) * \text{LoG}_h(r) \quad (1)$$

$$R = \sqrt{(x^2 + y^2 + z^2)} \quad (2)$$

where h is a parameter representing the scale of the LoG kernel, * is an operator representing convolution, and L(x,y,z,h) is the output value of the LoG kernel obtained when the scale is changed within a predetermined range $\{h_{min}, \ldots, h_{max}\}$ (FIG. 4B). In FIG. 4B, L(x,y,z,h) 530 represents an example of the distribution of the output values of the LoG kernel. Here, $h_{min}$ and $h_{max}$ are parameters that the operator can set to arbitrary values. After calculating the output value L(x,y,z,h) of the LoG kernel in accordance with equation (1), the reference point obtaining unit 1010 scans the output value L(x,y,z,h) and obtains the parameter h when the output value L(x,y,z,h) of the LoG kernel is maximized. Using the LoG kernel as an evaluation function used to obtain the image size, the reference point obtaining unit 1010 decides the image size of the image region (local image region) including the object region based on the distribution of the output values of the evaluation function. That is, the reference point obtaining unit 1010 decides the size (image size) of the object region and the local image region V(x,y,z) based on the parameter h obtained based on the distribution of the output values of the evaluation function. Note that the parameter h is a numerical value proportional to the size of the object region, and the size of the local image region V(x,y,z) set based on the parameter h is also an image size proportional to the magnitude of the parameter h. The reference point obtaining unit 1010 decides the image size of the image region (local image region) including the object region based on the parameter representing the scale of the evaluation function corresponding to the maximum value of the output value of the evaluation function.

In the above-described processing, the initial reference point $p_{seed\_j}$ (j=1, 2, . . . , m) and the LoG kernel are used to decide the size (image size) of the local image region V(x,y,z). However, the deciding method of the local image region V(x,y,z) is not limited to this. For example, if the operator selects a VOI (Volume Of Interest) including the pulmonary nodule region as the object region, instead of selecting the initial reference point, the VOI may be used as the local image region V(x,y,z).

An example in which the position of the local image region V(x,y,z) is set using $p_{seed\_0}$ as the centroid has been described above. However, this embodiment is not limited to this example. For example, the reference point obtaining unit 1010 can also set the centroid position of the local image region V(x,y,z) again based on the output value (for example, a pixel position where the parameter h is maximized) of the LoG kernel.

Next, the reference point obtaining unit 1010 obtains a plurality of reference points $p_{seed\_i}$ in the local image region V(x,y,z). Obtaining of the reference points can be executed by various methods. The reference point obtaining unit 1010 can set, as the plurality of reference points, for example, at least one initial reference point set based on input information from the operation unit 170 and a plurality of pixels each having an image feature similar to that of the initial reference point. The reference point obtaining unit 1010 can obtain (n−m) pixels each having an image feature similar to that of the initial reference point $p_{seed\_j}$ (j=1, 2 . . . , m) from the pixels in the local image region V(x,y,z), and obtain the (n−m) obtained pixels and the initial reference point $p_{seed\_j}$ (j=1, 2, . . . , m) as the plurality of reference points (n reference points). Alternatively, without using the initial reference point as a reference point, the reference point obtaining unit 1010 can set, as the reference points, a plurality of pixels each having an image feature similar to that of at least one initial reference point set based on input information from the operation unit 170. That is, the reference point obtaining unit 1010 can obtain, as the reference points, n pixels each having an image feature similar to that of the initial reference point $p_{seed\_j}$ (j=1, 2, . . . , m). As the image feature used to obtain the reference points, for example, the pixel value of each pixel of the processing target image, the output value of the LoG kernel, or the like can be used. The reference point obtaining unit 1010 can set the plurality of reference points based on the output value of the evaluation function using the LoG kernel. In this embodiment, the reference point obtaining unit 1010 sequentially obtains n pixels ($p_{seed\_i}$ (i=1, 2, . . . , n)) in descending order of the output value of the LoG kernel to form the reference point set P. The number n of pixels that form the reference point set P can be designated by the operator in advance from the operation unit 170. Alternatively, the reference point obtaining unit 1010 can obtain all pixels for which the output value of the LoG kernel exceeds a threshold determined in advance by the operator as the reference points to form the reference point set P.

The reference point obtaining method is not limited to the above-described method. For example, the reference point obtaining unit 1010 may execute the reference point obtaining by sampling pixels that satisfy a predetermined condition using the Markov chain Monte Carlo method or mean shift method based on the intensity values or gradient of pixels. In addition, the operator may add a necessary reference point or delete an unnecessary reference point via the operation unit 170 in visual observation.

(S1120)

In step S1120, the extraction result obtaining unit 1020 obtains the initial extraction results of a plurality of pulmonary nodules by initial region extraction processing. Using the local image region V(x,y,z) and the reference point set P obtained in step S1110, the extraction result obtaining unit 1020 obtains an initial extraction result from each reference point. By this processing, the initial extraction results of the pulmonary nodules in a one-to-one correspondence with the reference points are obtained. In this embodiment, the initial extraction result will be explained as a mask image in which the value of a pixel included in the extracted pulmonary nodule region (foreground region) is "1", and the value of a pixel included in another region (background region) is "0".

A case in which, for example, four (n=4) reference points (reference points 601 to 604) are obtained in the local image region V 510 (the pulmonary nodule region 520 in the local image region V 510) in step S1110, as shown in FIG. 5A, will be described below. First, the extraction result obtaining unit 1020 obtains a centroid $p_G$ of the four reference points. The position (center) of a new local image region V' can be set by obtaining the centroid $p_c$ of the reference points. That is, the extraction result obtaining unit 1020 can set, in the processing target image, the position of the image region (local image region) including the object region by obtaining the centroid of the plurality of reference points. The extraction result obtaining unit 1020 then creates the new local image region V'(x,y,z) having the centroid $p_c$ at the center. The image size of the new local image region V'(x,y,z) can arbitrarily be set by the operator. In addition, the extraction result obtaining unit 1020 can set the image size of the new local image region V'(x,y,z) such that it is drawn at least in the local image region V(x,y,z) previously set in step S1110. That is, the extraction result obtaining unit 1020 can set the image size of the new local image region V'(x,y,z) such that the image size is included in the image size of the previously set local image region V(x,y,z) or becomes equal to the image size of the local image region V(x,y,z). Alternatively, the extraction result obtaining unit 1020 can set the image size of the new local image region V'(x,y,z) such that the new local image region V'(x,y,z) includes the local image region V(x,y,z). The extraction result obtaining unit 1020 obtains an image region from the processing target image using the image size of the image region (local image region) including the object region and the position of the image region. Instead of using the centroid $p_c$ obtained based on the position information (coordinate information) of the four reference points, the extraction result obtaining unit 1020 may create the new local image region V'(x,y,z) using a reference point $p_1$ where the output value of the LoG kernel is maximum as the centroid. The local image region V'(x,y,z) generated based on the centroid of the reference points in this way does not depend on the position of the initial reference point $p_{seed\_j}$. That is, regardless of the point in the pulmonary nodule region selected by the operator as the initial reference point $p_{seed\_j}$, the new local image region V'(x,y,z) is an image that always includes the pulmonary nodule region at a predetermined position in the image and includes only a predetermined range of the background region around the pulmonary nodule region.

Next, the extraction result obtaining unit 1020 performs initial region extraction processing based on the reference points 601, 602, 603, and 604, thereby obtaining initial extraction results corresponding to the reference points. Here, the initial region extraction processing is executed by setting one reference point as the foreground region (seed) of the pulmonary nodule region and performing the region extension method, the level-set method, the graph-cut method, or the like. In this embodiment, processing of obtaining initial extraction results using the Level-set method will be described.

In the level-set method, a space one dimension higher than a target space is set, and the boundary of the object to be extracted is considered as a section (zero isosurface $\phi=0$) of an implicit function $\phi$ defined by the high-dimensional space. As the shape of the implicit function $\phi$ moves in accordance with time t, the boundary surface (zero isosurface $\phi=0$) of the object also gradually changes. Hence, when the shape of the implicit function $\phi$ is appropriately designed in accordance with the shape feature of the object, it is possible to naturally cope with a topology change in the contour of the object or generation of a singular point. In this embodiment, a certain reference point $p_{seed\_i}$ is used as an initial contour, that is, an initial zero isosurface ($\phi=0$), and the initial extraction result of a pulmonary nodule corresponding to the reference point is obtained.

FIG. 5B is a view showing an example of an initial extraction result (mask 611), an initial extraction result (mask 612), an initial extraction result (mask 613), and an initial extraction result (mask 614) obtained based on the reference points 601, 602, 603, and 604, respectively. The extraction result obtaining unit 1020 executes, for example, the same level-set method for the four reference points shown in FIG. 5A, thereby obtaining the initial extraction results (masks 611 to 614) of the regions (pulmonary nodule regions) of the object corresponding to the reference points. In FIG. 5B, the initial extraction result (mask 611) is an initial extraction result obtained by executing the level-set method using the reference point 601 as an initial contour, and the initial extraction result (mask 612) is an initial extraction result obtained by executing the level-set method using the reference point 602 as an initial contour. The initial extraction result (mask 613) is an initial extraction result obtained by executing the level-set method using the reference point 603 as an initial contour, and the initial extraction result (mask 614) is an initial extraction result obtained by executing the level-set method using the reference point 604 as an initial contour.

In the level-set method, a velocity function used to give a moving speed to a neighboring pixel (Front) to a pixel on the zero isosurface is set to change the zero isosurface (initial contour) of the implicit function $\phi$. The velocity function also serves as an evaluation function to design the shape of the implicit function $\phi$. The velocity function has a term considering a characteristic such as the intensity value or shape feature of the object to be extracted. The velocity function is set such that the moving speed becomes high for a contour without such a characteristic or becomes low for a contour having such a characteristic.

In this embodiment, as the first characteristic of a pulmonary nodule region, focus is placed on the difference in the intensity value between the inside and the outside of the pulmonary nodule (the characteristic of intensity value change). For example, the extraction result obtaining unit 1020 uses a velocity function $f_E(i,j,k)$ based on an edge intensity as represented by $$f_E(i, j, k) = \frac{1}{1 + \alpha|E(i, j, k)|} \quad (3)$$

where E(i,j,k) represents the edge intensity on a pixel (i,j,k), and $\alpha$ is a weight coefficient. E(i,j,k) is represented by an intensity gradient. In another example, it is possible to apply an edge detection filter such as a Sobel filter or a Laplacian filter to the processing target image and use the output value to set the velocity function. With the velocity function $f_E(i,j,k)$, the deformation velocity of the contour shape of the pulmonary nodule becomes high in a region where the intensity value change is small and low near an edge region where the intensity value change is large. The position of the contour is thus controlled such that the intensity value change becomes large in the region of the contour of the extracted object.

As the second characteristic of a pulmonary nodule region, focus is placed on the fact that the contour of the pulmonary nodule is smooth (the characteristic of contour shape (curvature characteristic)). For example, the extraction result obtaining unit 1020 uses a velocity function $f_\kappa(i,j,k)$ based on a curvature as represented by $$f_\kappa(i,j,k) = 1 - \beta \cdot \kappa(i,j,k) \quad (4)$$

where $\kappa(i,j,k)$ represents the curvature on the pixel (i,j,k), and $\beta$ is a weight coefficient. With the velocity function $f_\kappa(i,j,k)$, the deformation velocity of the contour shape of the pulmonary nodule becomes high in a portion where the curvature is small and low in a portion where the curvature is large. The position of the contour is thus controlled such that the curvature of the contour of the extracted object becomes large.

In the processing of obtaining the initial extraction results of pulmonary nodules according to this embodiment, the extraction result obtaining unit 1020 can also combine the two types of velocity functions ($f_E(i,j,k)$, $f_\kappa(i,j,k)$) as indicated by $$F_{i,j,k} = f_E(i,j,k) \mathsf{X} f_\kappa(i,j,k) \quad (5)$$

and use them as the velocity functions in the level-set method.

In the combined operation of the two types of velocity functions ($f_E$, $f_\kappa$) in equation (5), "$\mathsf{X}$" is an operator representing multiplication, addition, or the like of $f_E$ and $f_\kappa$. Note that in the velocity function of equation (5), a velocity function based on the operator "$\mathsf{X}$" may be performed for functions $w_E f_E$ and $w_\kappa f_\kappa$ obtained by multiplying the functions $f_E$ and $f_\kappa$ by the weight coefficients $w_E$ and $w_\kappa$, respectively.

When the velocity function of equation (5) is used, an initial extraction result (contour curve) $R_i$ of a pulmonary nodule corresponding to the reference point $p_{seed\_i}$ can be obtained. Note that a function using the intensity value information or prior knowledge of the pulmonary nodule may be added to equation (5), or the velocity function may be set by another combination. In addition, the method of the pulmonary nodule initial extraction processing may be switched based on the shape and properties of the pulmonary nodule. For example, for a pulmonary nodule with ground glass opacity (GGO), machine learning or the graph-cut method can be used. For a pulmonary nodule with an irregular shape and a small volume, level-set can be used. In addition, the extraction method may be switched based on the feature of a different reference point in the same pulmonary nodule.

As another example of step S1120, for example, the extraction result obtaining unit 1020 can execute a plurality of (c) extraction processes (extraction methods) for one reference point, and obtain c×n initial extraction results $R_i^j$ ($i=1, 2, \ldots, n; j=1, 2, \ldots, c$) from n reference points, where i represents a reference point, and j represents extraction processing (extraction method). The extraction result obtaining unit 1020 similarly executes the plurality of extraction processes (extraction methods) for other different reference points, and similarly calculates the feature amounts of initial extraction results at the obtained different reference points. The extraction result obtaining unit 1020 obtains an initial extraction result obtained by a method that minimizes the variance of feature amounts as a final initial extraction result. For example, the extraction result obtaining unit 1020 applies five extraction methods, and calculates the volume of each obtained region extraction result. If the variance of the volumes of the initial extraction results obtained by extraction method 3 of the five extraction methods is minimum, the extraction result obtaining unit 1020 obtains $R_i^3$ ($i=1, 2, \ldots, n$) as the final initial extraction result.

In this embodiment, an example in which each initial extraction result is obtained as a mask image in which the pixel value in the foreground region is 1, and the pixel value in the background region is 0 has been described. As another example of the initial extraction result, for example, a likelihood image in which each pixel value changes based on the magnitude of a deformation velocity obtained by equation (5) for each pixel may be obtained. In this case, the larger the value (likelihood) of a pixel is, the higher the possibility that the pixel is included in the pulmonary nodule region is.

(S1130)

Next, in step S1130, the extraction result integration unit 1030 generates an integration result by integrating the plurality of initial extraction results obtained by the extraction result obtaining unit 1020. The extraction result integration unit 1030 integrates the plurality of initial extraction results $R_i$ ($i=1, 2, \ldots, n$) obtained in step S1120, and obtains the result of the integration as $R_p(x,y,z)$ (integration result). In this embodiment, the pixel value of each pixel of the integration result $R_p(x,y,z)$ is expressed as a likelihood (existence probability p) representing the possibility that the pixel is included in the pulmonary nodule region, and the integration result $R_p(x,y,z)$ is obtained as the likelihood map of the pulmonary nodule region. The larger the value of a pixel in the integration result $R_p$ (likelihood map) is, the higher the possibility that the pixel is included in the pulmonary nodule region is.

Figures 6, 7:
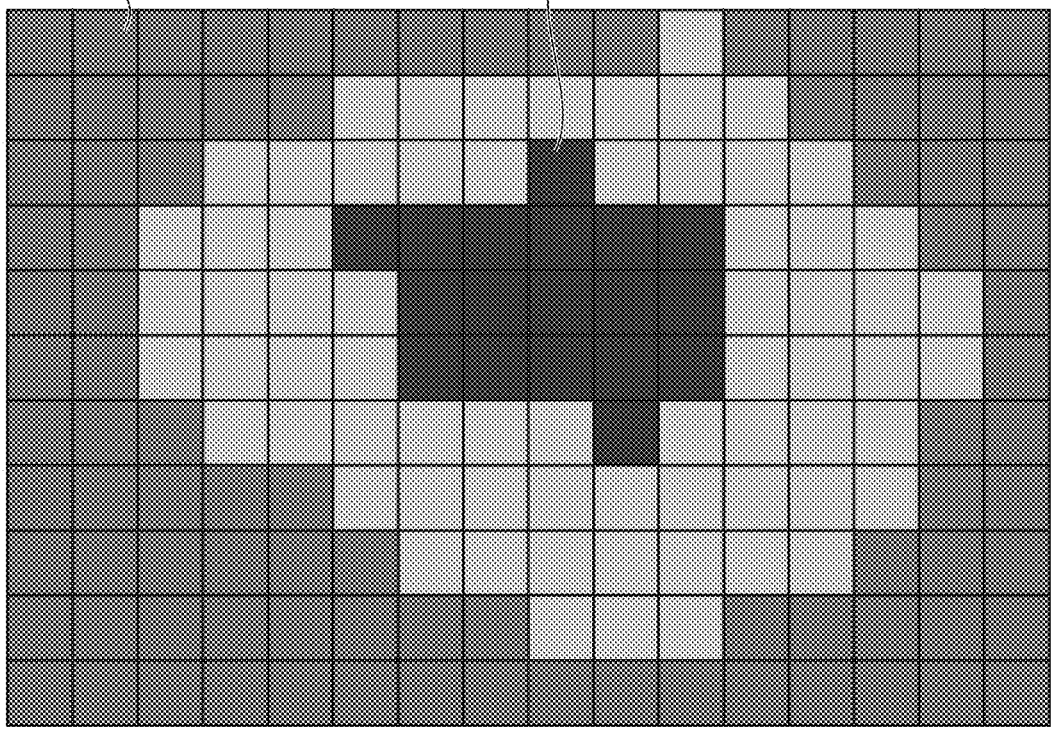
FIG. 6 is a view for explaining integration of initial extraction results according to the first embodiment.
FIG. 7 is a view for explaining region extraction processing according to the first embodiment.

In this embodiment, the extraction result integration unit 1030 adds the value of each pixel in each initial extraction result $R_i$ ($i=1, 2, \ldots, n$) to the same pixel in the integration result $R_p(x,y,z)$. When the value of each pixel in each initial extraction result $R_i$ is added to the same pixel in the integration result $R_p$, the plurality of initial extraction results $R_i$ ($i=1, 2, \ldots, n$) are integrated into one integration result $R_p(x,y,z)$. By the addition processing of adding the plurality of (n) initial extraction results, the extraction result integration unit 1030 can generate a likelihood map 700 as shown in FIG. 6 as the integration result $R_p(x,y,z)$. FIG. 6 is a view for explaining integration of initial extraction results. In FIG. 6, one cell represents one pixel (i,j,k). The numerical value of each cell (pixel) shows the result of addition processing, and represents the likelihood p that the pixel is included in the object region (pulmonary nodule region). A larger value of the likelihood p suggests that the possibility that the pixel is included in the pulmonary nodule region is high. Note that in this embodiment, the extraction result integration unit 1030 further performs normalization processing for the integration result $R_p(x,y,z)$ (likelihood map) to obtain a normalized likelihood map $R'_p(x,y,z)$. In the normalized likelihood map $R'_p(x,y,z)$, the value (likelihood p') of each pixel is normalized to a real number space [0,1].

As another example of the initial extraction result integration processing in step S1130, the extraction result integration unit 1030 can obtain the integration result $R_p(x,y,z)$ by the OR of the initial extraction results $R_i$ ($i=1, 2, \ldots, n$). The thus obtained integration result serves as the maximum reference region of the target pulmonary nodule. It is possible to limit the position of the contour in the maximum reference region based on the output of the velocity function and extract the pulmonary nodule region in the next step.

Note that the extraction result integration unit 1030 may execute initial extraction result selection processing as preprocessing before executing the above-described initial extraction result integration processing. For example, the extraction result integration unit 1030 can calculate a feature amount such as the volume of the object region or the diameter on a predetermined section for each initial extraction result obtained in step S1120. The extraction result integration unit 1030 can also perform statistical processing of the calculated feature amounts and delete, from the initial extraction result $R_i$, an initial extraction result with a feature amount largely deviated from the average value. For example, the extraction result integration unit 1030 can delete, from the initial extraction result $R_i$, an initial extraction result whose feature amount is deviated from the average value by an amount more than a threshold.

(S1140)

In step S1140, based on the reference point information obtained by the reference point obtaining unit 1010 and the initial extraction result integration result obtained by the extraction result integration unit 1030, the region extraction unit 1040 extracts the object region (pulmonary nodule region) from the processing target image obtained by the image obtaining unit 1000. The region extraction unit 1040 extracts the region of each pulmonary nodule that is the object region from the local image region of the processing target image using the reference point set P obtained in step S1110, the local image region V'(x,y,z) and the initial extraction result $R_i$ (i=1, 2, . . . , n) obtained in step S1120, and the normalized likelihood map $R'_p$ obtained in step S1130.

In this embodiment, the region extraction unit 1040 uses the level-set method again in the region extraction processing of the object region (pulmonary nodule region). First, the region extraction unit 1040 sets an initial contour, that is, an initial zero isosurface ($\phi$=0). Here, the centroid $p_G$ of the local image region V'(x,y,z) is obtained as the initial contour. Note that the region extraction unit 1040 can obtain an arbitrary reference point $p_{seed\_i}$ or all reference points from the reference point set P as the initial contour. Alternatively, the region extraction unit 1040 can perform threshold processing for the normalized likelihood map $R'_p$ and set a likelihood region more than the threshold to the initial contour.

Next, like the velocity functions (equations (3) and (4)) based on the first characteristic (the characteristic of intensity value change) and the second characteristic (the characteristic of contour shape), the region extraction unit 1040 sets a velocity function $f_p(i,j,k)$ based on the likelihood as the third characteristic (a likelihood characteristic representing a change in the likelihood of each pixel on the likelihood map) as indicated by $$f_p(i,j,k)=1+\gamma R'_p(i,j,k) \quad (6)$$

where $R'_p(i,j,k)$ is a value obtained by normalizing the value (likelihood p) of each pixel (i,j,k), and $\gamma$ is a weight coefficient. With the velocity function $f_p(i,j,k)$, the deformation velocity of the contour shape of the object region (pulmonary nodule region) becomes high in a portion where the likelihood is high and low in a portion where the likelihood is low. The position of the contour is thus controlled such that the likelihood on the normalized likelihood map $R'_p$ becomes high in the extracted object. The region extraction unit 1040 controls the position of the contour based on the output of the velocity function $f_p(i,j,k)$ represented by equation (6) using the initial contour (initial zero isosurface ($\phi$=0)) as the starting point.

In the region extraction processing of this embodiment, after the region extraction processing is performed based on the initial contour using each of the plurality of reference points, the plurality of obtained initial extraction results are integrated into a likelihood map and normalized. The normalized likelihood map $R'_p$ is generated by integrating the plurality of initial extraction results and therefore does not depend on one initial extraction result or one reference point. It is therefore possible to extract the object region (pulmonary nodule region) at high reproducibility and high accuracy by using the velocity function represented by equation (6). In this embodiment, the region extraction unit 1040 further combines the velocity function of equation (6) with the velocity function of equation (5) to set a new velocity function given by equation (7), and executes the region extraction processing. The region extraction unit 1040 can execute the region extraction processing using the velocity function of equation (7) below by referring to the likelihood map (normalized likelihood map $R'_p$) generated by integrating the plurality of initial extraction results. The region extraction unit 1040 extracts the object region from the processing target image based on the integrated extraction result obtained by integrating (adding) the values of the pixels in the plurality of initial extraction results and the characteristics (the characteristic of intensity value change and the characteristic of contour shape) of the object region. The region extraction unit 1040 extracts, from the processing target image, the object region whose contour is decided based on the output result of the function that evaluates the characteristic of intensity value change, the output result of the function that evaluates the change in the characteristic of contour shape, and the output result of the function that evaluates the change in the likelihood of each pixel in the likelihood map. That is, the region extraction unit 1040 extracts the object region from the processing target image based on the evaluation result of the characteristic of intensity value change, the evaluation result of the characteristic of contour shape, and the evaluation result of the likelihood of each pixel in the likelihood map.

$$F'_{i,j,k}=f_E(i,j,k) \mathbb{X} f_\kappa(i,j,k) \mathbb{X} f_p(i,j,k) \quad (7)$$

In the combined operation of the three types of velocity functions ($f_E$, $f_\kappa$, $f_p$) in equation (7), "$\mathbb{X}$" is an operator representing multiplication, addition, or the like of $f_E$, $f_\kappa$, and $f_p$. Note that in a velocity function F' of equation (7), a velocity function based on the operator "$\mathbb{X}$" may be performed for functions $w_E f_E$, $w_\kappa f_\kappa$, and $w_p f_p$ obtained by multiplying the functions $f_E$, $f_\kappa$, and $f_p$ by the weight coefficients $w_E$, $w_\kappa$, and $w_p$, respectively.

The velocity function F' represented by equation (7) is a function in which the characteristic of intensity value change ($f_E$), the curvature characteristic ($f_\kappa$), and the likelihood characteristic ($f_p$) interact. The region extraction unit 1040 can extract the object region (pulmonary nodule region) in the processing target image at high reproducibility and high accuracy by using the velocity function F' represented by equation (7). The region extraction unit 1040 defines a contour obtained when the deformation (movement) of the contour controlled by the velocity function represented by equation (7) stops, that is, when the difference in the deformation (amount) calculated by a repetitive operation becomes zero as an extraction result $R_f$ of the pulmonary nodule region. Alternatively, the region extraction unit 1040 defines, as the extraction result $R_f$ of the pulmonary nodule region, a contour obtained when the deformation amount from the previous deformation by a repetitive operation of the deformation controlled by the velocity function represented by equation (7) becomes equal to or smaller than a preset threshold.

As another example of the processing of step S1140, the region extraction unit 1040 may use a region extraction method such as the graph-cut method or the water flow method for the region extraction processing. FIG. 7 is a view for explaining an example of region extraction processing. For example, in the region extraction method based on the graph-cut method, as shown in FIG. 7, the region extraction unit 1040 defines a pixel whose likelihood value in the normalized likelihood map $R'_p$ is higher than a threshold T1 as a foreground region $R_{obj}$ (710), and defines a pixel whose likelihood value in the normalized likelihood map $R'_p$ is lower than a threshold T2 as a background region $R_{bkg}$ (720). The region extraction unit 1040 then obtains an energy (E=$\Sigma\alpha$+$\Sigma\beta$) defined by a data term ($\Sigma\alpha$) using the pixel value of each pixel in the local image region V'(i,j,k) or the normalized likelihood map R'(i,j,k) and a smoothing term ($\Sigma\beta$) according to the value of an adjacent pixel. The energy becomes small when the pixel of interest is close to a set characteristic, and the pixel value becomes large at the boundary. The region extraction unit 1040 can obtain the boundary that minimizes the energy (E) as the contour of the pulmonary nodule region. The region extraction unit 1040 may execute the region extraction processing in step S1140 by using, for example, an expected intensity value of the pulmonary nodule as the object, information about the shape, or statistical information in addition to the above-described method.

(S1150)

In step S1150, the display control unit 1050 performs display control to cause the display unit 160 to display the result of region extraction. The display control unit 1050 transmits information (the result of region extraction) about the region extracted in step S1140 to the display unit 160 connected to the image processing apparatus 100, and performs control to cause the display unit 160 to display the result of region extraction. The display control unit 1050 can perform display control to cause the display unit 160 to display, for example, an image (to be referred to as a composite image hereinafter) composited by superimposing the extracted object region on the original three-dimensional CT image (processing target image). As another example, the display control unit 1050 can perform display control to cause the display unit 160 to display a composite image of the object region and a two-dimensional slice image taken along a predetermined plane. As still another example, the display control unit 1050 can perform volume rendering of a three-dimensional composite image and perform display control to cause the display unit 160 to display it.

Figure 8:
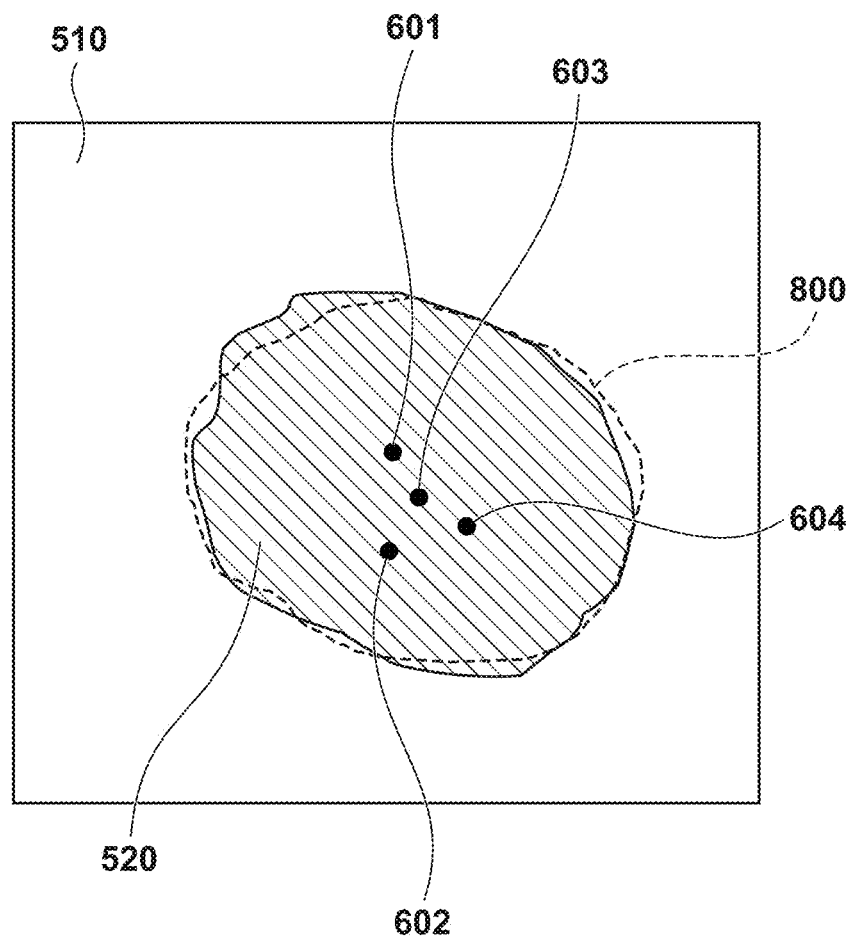
FIG. 8 is a view for explaining display of a result according to the first embodiment.

The display control unit 1050 can control the display form of the result of region extraction. For example, the display control unit 1050 can display a contour 800 of the extracted object region as a curved line indicated by the broken line, as shown in FIG. 8, or change the display color inside the contour 800. At this time, the display control unit 1050 may cause the display unit to display the reference points (601 to 604) used for region extraction processing and the contour 800 of the extracted object region together.

The display control unit 1050 can perform display control to display an arrow-shaped graphic superimposed on the processing target image such that the point of the arrow indicates the extracted region. The display control unit 1050 may change the above-described display form in accordance with the size of the extracted object region. For example, if the size of the extracted object region is equal to or larger than a predetermined threshold, the contour may be indicated by a curved line as a solid line or a broken line. If the size is smaller than the threshold, the position of the extracted region may be indicated by the point of an arrow. By the display control of the display control unit 1050, the extracted region can easily be observed in the processing target image.

The effect of the image processing technique (the image processing apparatus, the system, and the image processing method) according to the first embodiment will be described next. The image processing technique according to this embodiment can solve the problem of reproducibility of an extracted region in the conventional region extraction method. In the conventional region extraction method, even when extracting the same pulmonary nodule region as in this embodiment as the object region, if the range of the background region drawn in the image is different, or if the position of the pulmonary nodule region in the image is different, region extraction results may be unable to match, resulting in a problem of reproducibility of the extracted region. In addition, if the initial contour that is the input of region extraction processing is different, a different region extraction result may be obtained, resulting in a problem of reproducibility of the extracted region.

On the other hand, in the image processing apparatus according to this embodiment, a plurality of reference points are set based on a method (in this embodiment, the output value of a LoG kernel) based on a scale space from an initial reference point manually set by the operator, and the local image region V' is generated from the reference points. The method based on the scale space can always generate a predetermined output independently of the operation of the operator. Hence, the local image region V' set based on this image processing technique is a stable image, that is, an image that includes the object region (pulmonary nodule region) at a predetermined position in the image and includes only a predetermined range of the background region around the object region (pulmonary nodule region).

Additionally, in the region extraction processing according to this embodiment, region extraction processing is temporarily performed to obtain an initial contour using each of the plurality of reference points. After that, a plurality of obtained initial extraction results are integrated to a likelihood map (normalized likelihood map $R'_p$), and region extraction processing is executed again by referring to the likelihood map. This processing makes it possible to suppress fluctuations in extraction that occur in region extraction processing using individual velocity functions and obtain the same region extraction result for the same region (improve the reproducibility of the extracted region). Additionally, in the region extraction processing according to this embodiment, it is also important to use the local image region V' (stable local image region) generated by the above-described method. By integrating a plurality of region extraction results, a portion whose extraction fails in individual region extraction processes can be satisfactorily extracted (extraction accuracy can be increased).

As described above, according to the image processing technique (the image processing apparatus, the system, and the image processing method) of the first embodiment of the present invention, it is possible to extract the object region at high accuracy and high reproducibility.

Second Embodiment

Image processing according to the second embodiment of the present invention will be described. In this embodiment, an arrangement that calculates the variation of an object region to be extracted (for example, the difference in the volume of an object region to be extracted) along with an increase in reference points (sequential additional setting of reference points) obtained by a reference point obtaining unit 1010, and repeats the processing until the variation (the difference in the volume) converges to execute object region extraction processing will be explained. Note that the variation in the object region to be extracted is not limited to the difference in the volume, and may be, for example, the difference in feature information representing a feature of the object region to be extracted, such as the position information of the contour of the object region or the area of a predetermined section of the object region.

(Functional Arrangement)

Figure 9:
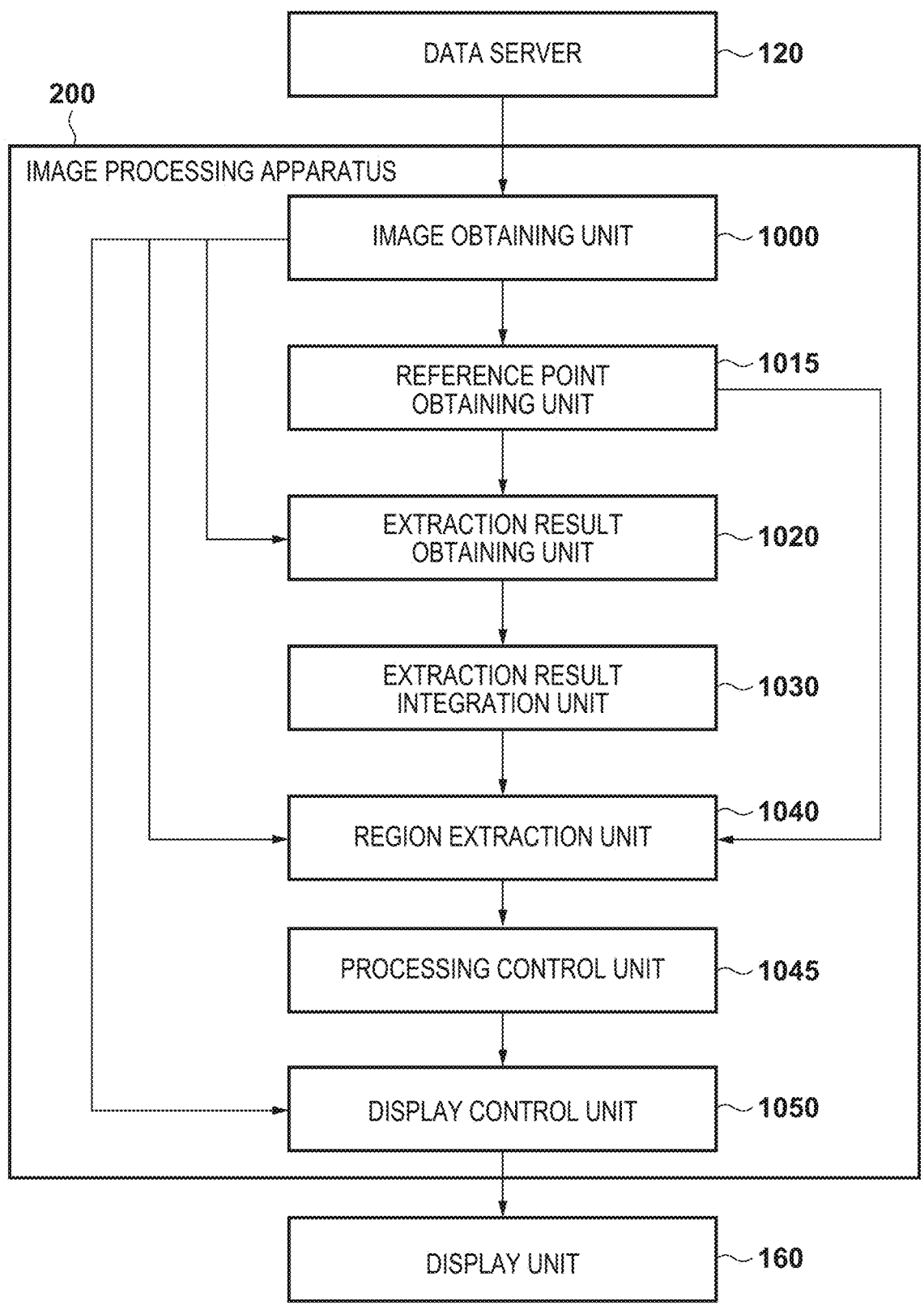
FIG. 9 is a block diagram showing the functional arrangement of an image processing system according to the second embodiment.

Each functional arrangement of an image processing apparatus 200 according to the second embodiment of the present invention will be described with reference to FIG. 9. The image processing apparatus 200 executes image processing according to the second embodiment of the present invention. The image processing apparatus 200 includes, as the functional arrangements, an image obtaining unit 1000, a reference point obtaining unit 1015, an extraction result obtaining unit 1020, an extraction result integration unit 1030, a region extraction unit 1040, a processing control unit 1045, and a display control unit 1050. The same reference numerals as in FIG. 2 denote arrangements having the same functions as the functional arrangements of the image processing apparatus 100 according to the first embodiment, and a detailed description thereof will be omitted.

The reference point obtaining unit 1015 (setting unit) sequentially sets reference points in groups of several points. The reference point obtaining unit 1015 additionally sets a plurality of reference points in a repetitive operation. The extraction result obtaining unit 1020 obtains, as an initial extraction result, the contour of an object region corresponding to each of the plurality of set first reference points and the plurality of additionally set second reference points. Every time the reference point obtaining unit 1015 sets a reference point, the region extraction unit 1040 extracts the object region. The region extraction unit 1040 extracts the object region from the processing target image based on an integration result obtained by integrating (adding) the values of pixels in a plurality of initial extraction results obtained based on the plurality of first reference points and the plurality of additionally set second reference points.

As the plurality of additionally set reference points increase, the processing control unit 1045 (determination unit) obtains a variation $\rho$ of feature information representing a feature of the object region extracted by the region extraction unit 1040, and determines, based on the comparison between the variation $\rho$ and a threshold, whether to continue the repetitive operation. As convergence determination processing, the processing control unit 1045 compares the variation $\rho$ of the object region with the threshold, and if the variation is equal to or smaller than the threshold, determines that the variation has converged. The image processing according to this embodiment enables more efficient and accurate extraction of the object region by repetition of the processing from the reference point obtaining unit 1015 to the region extraction unit 1040 until the variation $\rho$ of the object region converges to the threshold or less.

(Processing Procedure)

Figure 10:
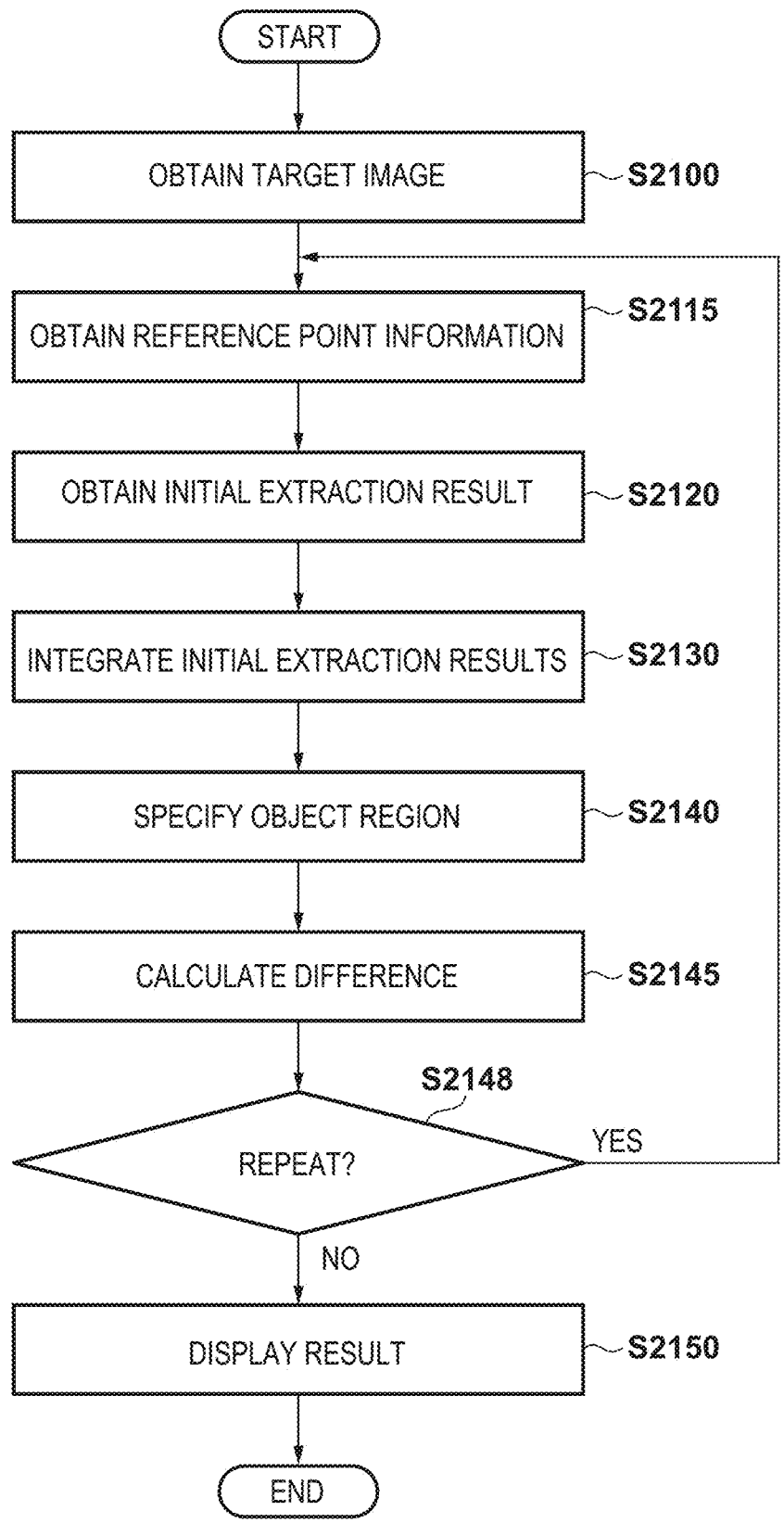
FIG. 10 is a flowchart showing the processing procedure of an image processing apparatus according to the second embodiment.

Image processing according to the second embodiment of the present invention will be described next. FIG. 10 is a flowchart showing a processing procedure to be executed by the image processing apparatus 200 according to this embodiment. This embodiment is implemented by executing, by a CPU 11, a program configured to implement the function of each unit and stored in a main memory 12. The processes of steps S2100, S2120, S2130, and S2140 are the same as the processes of steps S1100, S1120, S1130, and S1140 shown in FIG. 3, and a detailed description thereof will be omitted.

(S2100)

In step S2100, the image obtaining unit 1000 obtains a processing target image as a target of image processing. That is, the image obtaining unit 1000 obtains a CT image as a processing target image from a data server 120, and stores it in the main memory 12 of the image processing apparatus 200. This processing is the same as in step S1100, and a detailed description of obtaining of the processing target image will be omitted.

(S2115)

In step S2115, the reference point obtaining unit 1015 obtains reference point information concerning a plurality of points (reference points) that are included at a high probability in the object region included in the processing target image by executing repetitive processing. That is, the reference point obtaining unit 1015 obtains a plurality of reference points used to obtain initial extraction results by executing repetitive processing. To execute the repetitive processing, the reference point obtaining unit 1015 performs processing based on a previous processing result. For example, let S be the repetitive processing count. When S=1 (first reference point obtaining), the reference point obtaining unit 1015 obtains, as reference points, $n_1$ points (pixels) in descending order of the output value of a LoG kernel. Next, when S=2 (second reference point obtaining), the reference point obtaining unit 1015 obtains, as the additional reference points, $n_2$ points (pixels) in descending order of the output value of a LoG kernel from a point having the $(n_1+1)$th magnitude of the output value of the LoG kernel. This processing is repetitively executed until the processing control unit 1045 (to be described later) determines completion of convergence of the change in the region extraction result. The number $n_2$ of reference points obtained by the reference point obtaining unit 1015 may equal the number $n_1$ of reference points obtained by the reference point obtaining unit 1015 when the repetitive processing count S=1. Alternatively, the operator may arbitrarily set a different number of reference points as needed. This also applies to a case in which the repetitive processing count S>2. The reference point obtaining unit 1015 may increase the number of reference points to be obtained in accordance with the repeat count. For example, in step S2115, if S=1, the reference point obtaining unit 1015 may obtain one point as a reference point. If S=2, the reference point obtaining unit 1015 may obtain two points as reference points. If S=3, the reference point obtaining unit 1015 may obtain three points as reference points.

Note that the processing of step S2115 may be done via manual input by the operator. For example, the display control unit 1050 performs display control of a display unit 160 and presents a previous extraction result to the operator. The operator can manually input a new reference point via an operation unit 170 based on the presentation of the previous extraction result. The reference point obtaining unit 1015 obtains the reference point manually input by the operator. By providing such an opportunity of manual input, if, for example, a nodule region to be extracted is partially unextracted, the operator can obtain a point near the unextracted region newly as a reference point and can consequently extract the unextracted region.

The reference point group newly obtained by the above-described reference point obtaining processing executed by the reference point obtaining unit 1015 is defined as $p^S_{seed\_i}$ (i=1, 2, . . . , $n_s$). The reference point obtaining unit 1015 may cause the display unit to display the previously obtained reference points and extraction results via the display control unit 1050, and cause the display unit to display the newly obtained reference points such that they can be discriminated from the previously obtained reference points. Alternatively, the reference point obtaining unit 1015 may cause the display unit to display the reference points superimposed on the processing target image via the display control unit 1050, and the operator may manually delete an unnecessary reference point by operating the operation unit 170 while referring to the display unit 160.

(S2120)

In step S2120, the extraction result obtaining unit 1020 obtains the initial extraction results of a plurality of pulmonary nodules by initial region extraction processing. Using a local image region V'(x,y,z) and the reference point group $p^S_{seed\_i}$, the extraction result obtaining unit 1020 executes a plurality of times of region extraction processing and obtains an initial extraction result $R^S_i$ (i=1, 2, ..., $n_s$) of a pulmonary nodule corresponding to each reference point, as in step S1120. S is the repetitive processing count.

(S2130)

In step S2130, the extraction result integration unit 1030 generates an integration result by integrating the plurality of initial extraction results obtained by the extraction result obtaining unit 1020. The extraction result integration unit 1030 obtains an integration result $R_p(x,y,z)$ by integrating all initial extraction results $R^1_i$ (i=1, 2, ..., $n_1$), $R^2_i$ (i=1, 2, ..., $n_2$), ..., $R^S_i$ (i=1, 2, ..., $n_s$) obtained in step S2120. The extraction result integration unit 1030 then performs normalization processing for the obtained integration result $R_p(x,y,z)$ (likelihood map) to obtain a normalized likelihood map $R'_p$. The processing by the extraction result integration unit 1030 is the same as the processing of step S1130 described with reference to FIG. 6 of the first embodiment, and a description thereof will be omitted.

(S2140)

In step S2140, based on the reference point information obtained by the reference point obtaining unit 1010 and the initial extraction result integration result obtained by the extraction result integration unit 1030, the region extraction unit 1040 extracts the object region (pulmonary nodule region) from the processing target image obtained by the image obtaining unit 1000. The region extraction unit 1040 extracts the region of the pulmonary nodule that is the object region using the local image region V'(x,y,z), the reference point group $p^S_{seed\_i}$, the initial extraction result $R^s_i$, and the normalized likelihood map $R'_p$. Let $R_f(S)$ be the Sth region extraction result of the pulmonary nodule region extracted by the region extraction unit 1040. This processing is the same as in step S1140 described in the first embodiment, and a description thereof will be omitted.

(S2145 and S2148)

In step S2145, the processing control unit 1045 calculates the difference between the Sth region extraction result $R_f(S)$ obtained ins step S2140 and the (S−1)th region extraction result $R_f(S−1)$. In step S2148, the processing control unit 1045 performs determination processing of comparing the calculated difference with a threshold and determining whether to perform repetitive processing. The determination processing is executed based on, for example, a difference $V_{diff}$ between the volume of the Sth region extraction result $R_f(S)$ and the volume of the (S−1)th region extraction result $R_f(S−1)$. If the volume difference $V_{diff}$ is larger than a threshold $V_\tau$ (YES in step S2148), the processing control unit 1045 determines to repetitively execute the processing (steps S2100 to S2140) from the reference point obtaining unit 1010 to the region extraction unit 1040. If the volume difference $V_{diff}$ is equal to or smaller than the threshold $V_\tau$ (NO in step S2148), the processing control unit 1045 determines that the region extraction result has converged (convergence completion determination). The threshold $V_\tau$ used in the determination processing may be calculated by $$V_\tau = \omega \cdot s_{-1} \quad (8)$$

where ω is a coefficient, and $V_{S−1}$ is the volume of the (S−1)th region extraction result $R_f(S−1)$. $V_\tau$ may be set in advance by the operator. Note that when executing the determination processing using equation (8), for the first region extraction result ($R_f(1)$), the processing control unit 1045 automatically determines to perform repetitive processing because the threshold $V_\tau$ is not obtained yet when S=1. If the processing control unit 1045 determines to perform repetitive processing, the reference point obtaining unit 1015, the extraction result obtaining unit 1020, the extraction result integration unit 1030, and the region extraction unit 1040 execute the corresponding processes again.

(S2150)

In step S2150, the display control unit 1050 performs processing of displaying the result of region extraction. That is, if the processing control unit 1045 determines that the volume difference $V_{diff}$ is equal to or smaller than the threshold $V_\tau$, the display control unit 1050 transmits the result of region extraction to the display unit 160 connected to the image processing apparatus 200, and performs control to cause the display unit 160 to display the result of region extraction. The processing of step S2150 is the same as in step S1150 described with reference to FIG. 8 of the first embodiment, and a description thereof will be omitted.

According to the image processing apparatus of the second embodiment of the present invention, a plurality of initial extraction results are sequentially generated and integrated by sequential additional obtaining of reference points, and convergence determination processing of the region extraction result is performed. This makes it possible to extract the region more efficiently and accurately.

Each of the image processing apparatus and the image processing system according to each of the above-described embodiments may be implemented as a single device, or apparatuses including a plurality of information processing apparatuses may be combined to be communicable with each other to execute the above-described processing. Both forms are included in the embodiments of the present invention. The above-described processing may be executed by a common server apparatus or a server group. In this case, the common server apparatus corresponds to the image processing apparatus according to the embodiment, and the server group corresponds to the image processing system according to the embodiment. The plurality of devices that constitute the image processing apparatus and the image processing system need only be communicable at a predetermined communication rate and need not always exist in the same facility or same country.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-144750, filed Jul. 22, 2016, which is hereby incorporated by reference herein in its entirety.

What is claimed is:

1. An image processing apparatus configured to extract an object region in a target processing image and generate a composite image for display, the image processing apparatus comprising:
   a memory configured to store instructions; and
   a processor configured to execute the stored instructions to:
   set a plurality of seed points within the object region in the target processing image for extracting a plurality of contours in the target processing image, the plurality of contours associated with the object region in the target processing image;
   obtain the plurality of contours of the object region in the target processing image, each contour of the plurality of contours corresponding to a respective seed point of the plurality of seed points, as an extraction result based on a characteristic of the object region in the target processing image;
   extract the object region in the target processing image based on an integration result obtained at least by adding values of pixels in the plurality of contours in the target processing image; and
   generate the composite image for display by superimposing the extracted object region or a contour of the extracted object region on the target processing image.

2. The image processing apparatus according to claim 1, wherein the processor is configured to execute further instructions to generate a likelihood map representing a likelihood that each pixel in the integration result is included in the object region, and extract the object region from the target processing image based on the likelihood map.

3. The image processing apparatus according to claim 2, wherein the processor is configured to execute further instructions to extract the object region from the target processing image based on the likelihood of each pixel in the likelihood map and the characteristic of the object region.

4. The image processing apparatus according to claim 2, wherein the characteristic of the object region includes a characteristic of an intensity value change representing that an intensity value changes between an inside and an outside of the object region, and a characteristic of a contour shape of the object region.

5. The image processing apparatus according to claim 4, wherein the processor is configured to execute further instructions to extract the object region from the target processing image based on an evaluation result of the characteristic of the intensity value change, an evaluation result of the characteristic of the contour shape, and an evaluation result of the likelihood of each pixel in the likelihood map.

6. The image processing apparatus according to claim 1, wherein the processor is configured to execute further instructions to extract the object region from the target processing image based on a result obtained by adding the values of the pixels in the plurality of contours at the same pixel position.

7. The image processing apparatus according to claim 1, wherein the processor is configured to execute further instructions to set, as the plurality of seed points, a plurality of pixels each having an image feature similar to an image feature of a seed point set based on input information from an operation unit.

8. The image processing apparatus according to claim 7, wherein the processor is configured to execute further instructions to set, as the plurality of seed points, the seed point set based on the input information from the operation unit and the plurality of pixels each having the image feature similar to the image feature of the seed point.

9. The image processing apparatus according to claim 7, wherein the processor is configured to execute further instructions to use a LoG (Laplacian of Gaussian) kernel as an evaluation function used to obtain an image size, and determine the image size of an image region including the object region based on a distribution of output values of the evaluation function.

10. The image processing apparatus according to claim 9, wherein the processor is configured to execute further instructions to determine the image size of the image region including the object region based on a parameter representing a scale of the evaluation function corresponding to a maximum value of the output value of the evaluation function.

11. The image processing apparatus according to claim 10, wherein the processor is configured to execute further instructions to set the plurality of seed points based on the output value of the evaluation function.

12. The image processing apparatus according to claim 11, wherein the processor is configured to execute further instructions to obtain a centroid of the plurality of seed points, thereby setting a position of the image region including the object region, and obtain the image region from the target processing image using the image size and the position.

13. The image processing apparatus according to claim 9, wherein the image feature includes one of the pixel value of each pixel that constitutes the target processing image and the output value of the evaluation function.

14. The image processing apparatus according to claim 1, wherein the processor is configured to:
   execute further instructions to set the plurality of seed points in a repetitive operation;
   obtain, as the plurality of contours, the contour of the object region corresponding to each of a plurality of set first seed points and a plurality of additionally set second seed points; and
   extract the object region from the target processing image based on an integration result obtained by integrating the values of pixels in the plurality of contours obtained based on the plurality of first seed points and the plurality of additionally set second seed points.

15. The image processing apparatus according to claim 14, wherein the processor is configured to execute further instructions to obtain a variation of feature information representing a feature of the extracted object region as the plurality of additionally set seed points increase, and determine, based on a comparison between the variation and a threshold, whether to continue the repetitive operation.

16. The image processing apparatus according to claim 1, wherein the processor is configured to execute further instructions to perform display control to cause a display unit to display a result of region extraction, and to display the composite image.

17. An image processing system comprising:
an imaging apparatus configured to capture a target processing image; and
an image processing apparatus configured to extract an object region in the target processing image and generate a composite image for display, the image processing apparatus comprising:
a memory configured to store instructions; and
a processor configured to execute the stored instructions to:
set a plurality of seed points within the object region in the target processing image for extracting a plurality of contours in the target processing image, the plurality of contours associated with the object region in the target processing image;
obtain the plurality of contours of the object region in the target processing image, each contour of the plurality of contours corresponding to a respective seed point of the plurality of seed points, as an extraction result based on a characteristic of the object region in the target processing image;
extract the object region in the target processing image based on an integration result obtained at least by adding values of pixels in the plurality of contours in the target processing image; and
generate the composite image for display by superimposing the extracted object region or a contour of the extracted object region on the target processing image.

18. An image processing method of controlling an image processing apparatus configured to extract an object region in a target processing image and generating a composite image for display, the method comprising:
setting a plurality of seed points within the object region in the target processing image for extracting a plurality of contours in the target processing image, the plurality of contours associated with the object region in the target processing image;
obtaining the plurality of contours of the object region in the target processing image, each contour of the plurality of contours corresponding to a respective seed point of the plurality of seed points, as an extraction result based on a characteristic of the object region in the target processing image;
extracting the object region in the target processing image based on an integration result obtained at least by adding values of pixels in the plurality of contours in the target processing image; and
generating the composite image for display by superimposing the extracted object region or a contour of the extracted object region on the target processing image.

19. A non-transitory computer readable storage medium storing a program configured to cause a computer to execute an image processing method of controlling an image processing apparatus configured to extract an object region in a target processing image and generating a composite image for display, the image processing method comprising:
setting a plurality of seed points within the object region in the target processing image for extracting a plurality of contours in the target processing image, the plurality of contours associated with the object region in the target processing image;
obtaining the plurality of contours of the object region in the target processing image, each contour of the plurality of contours corresponding to a respective seed point of the plurality of seed points, as an extraction result based on a characteristic of the object region in the target processing image;
extracting the object region in the target processing image based on an integration result obtained at least by adding values of pixels in the plurality of contours in the target processing image; and
generating the composite image for display by superimposing the extracted object region or a contour of the extracted object region on the target processing image.

20. The image processing apparatus according to claim 1, wherein the processor is configured to execute further instructions to extract the object region for each of the plurality of seed points, obtain each extraction result of the object region corresponding to each seed point, and extract the object region from the target processing image based on a result obtained by adding values of respective pixels at the same pixel position in the plurality of extraction results.

* * * * *